United States Patent [19]
McLaughlin

[11] Patent Number: 6,096,409
[45] Date of Patent: Aug. 1, 2000

[54] IMAGE BEARING COMPOSITE OPTICAL MATERIAL

[76] Inventor: Michael K. McLaughlin, 1013 8th St., Laurel, Md. 20707

[21] Appl. No.: 09/232,726

[22] Filed: Jan. 19, 1999

[51] Int. Cl.[7] ........................................................ B32B 9/00
[52] U.S. Cl. ........................... 428/195; 428/13; 428/35.7; 428/35.9; 428/44; 428/46; 428/47; 428/58; 428/76; 428/193; 428/204; 428/315.9; 428/411.1; 430/13; 430/213; 281/109; 281/110; 156/299; 156/300; 40/427; 40/431
[58] Field of Search ................................ 428/204, 76, 203, 428/44, 46, 47, 58, 193, 35.7, 35.9, 315.9, 195, 411.1, 13; 281/109, 110; 430/13, 213; 156/300, 271, 299; 40/427, 431, 615

[56] References Cited

U.S. PATENT DOCUMENTS 2,240,072  4/1941  Hodgdon ................................. 154/50
4,619,876  10/1986  Woodward ............................... 430/11

*Primary Examiner*—Deborah Jones
*Assistant Examiner*—Abraham Bahta
*Attorney, Agent, or Firm*—James F. Cottone

[57] ABSTRACT

An image bearing composite optical material is formed as a laminated flexible sheet having an image bearing photographic quality film layer variously bonded between outer and inner translucent layers of paper, fabric, or synthetic materials. The composite optical material provides two sharply distinct appearances dependent upon being viewed under backlit or ambient illumination conditions. Full-colored and precisely detailed images are produced under backlighted conditions; a plain appearance is produced otherwise. Improved embodiments include a nonbilateral structure wherein a middle image bearing film layer is bonded over its entire adjacent surface with an outer translucent layer, and is bonded at widely separated points or along thin lines with an inner translucent layer to produce an air gap there between. The air gap embodiment negates image transmission under nonbacklit viewing conditions.

15 Claims, 2 Drawing Sheets

IMAGE BEARING COMPOSITE OPTICAL MATERIAL

TECHNICAL FIELD

The present invention relates generally to an image bearing composite optical material, and in particular to a three-layered sheet of material of indeterminate size having a photographic quality transparency as its middle layer, whose images become visible only when suitably backlighted.

BACKGROUND

Methods and apparatus for embedding images into articles of utility have a long history of development as artisans and craftsmen over the years have continually attempted to introduce visual excitement and interest into articles of a more or less utilitarian nature. These efforts persist because they lend a desirable and pleasant richness to everyday articles. Flexible articles in thin sheet form have especially been the subject of these image-embedding efforts, due to their being an ideal medium into which to incorporate images. This follows naturally as images also are frequently rendered on flexible substrates. Clothing and wall hangings are among the oldest and most common examples of combining images with or into sheets. Upon development later of transparent and translucent materials in sheet form, the creation of an entirely new form of image/web combining evolved. In general, this new form centered around sandwiching images of all types between one or more transparent outer layers for a wide range of purposes beyond the basic purpose of adding a pleasing or aesthetic appearance to an otherwise plain article. Typical secondary purposes have included a desire to protect the images from physical wear and tear, and to prevent destruction of the image medium itself from exposure to water or high moisture.

Descriptions of typical prior art approaches to embedding images into flexible sheets or webs may be found in a number of U.S. patents. Illustrative early teachings that have incorporated simple designs and text messages into translucent materials may be found in U.S. Pat. Nos. 467,567 to Michel and U.S. Pat. No. 2,240,072 to Hodgdon et al. In the 1892 '567 patent, a window shade is described that includes an inner opaque pattern (stylized flowers and straight-lined borders) sandwiched between a top translucent coating and a translucent sized body, so that the pattern is exposed only when the shade is held against light. In the 1941 '072 patent, a pair of transparent outer layers sandwich between them a layer of adhesive that is not as transparent as the outer layers. When the adhesive is still soft, images are physically impressed upon it to produce varying thicknesses. These varying adhesive thicknesses produce variable transparency such that the simple designs and letters become visible when the material is held to a light.

U.S. Pat. No. 1,975,579 to Kernes also provides an early (1934) teaching of a multiple-layered material that may contain pictures, designs, illustrations, and prints interposed between the tissue paper layers forming the overall composite material.

U.S. Pat. No. 5,545,446 to Looi et al. provides a teaching illustrative of a large body of art wherein transparent or translucent layers are formed over inner layers that bear various graphical indicia, generally for the purpose of providing physical or waterproofing protection to the image while providing a pleasing-appearing article formed from the composite, which is visible apparently regardless of the ambient lighting conditions.

While each of these prior art approaches teaches one or another aspect of producing and using flexible sheets having designs and graphical indicia of simple sorts associated with translucent image production, none approaches the unique and elegant capabilities that the present invention admirably provides. Therefore, the image bearing composite optical material as taught in the present invention provides a significantly improved structural and functional capability in this area while retaining all of the desirable high resolution optical properties and simple-to-use attributes.

OBJECTS OF THE INVENTION

It is therefore a primary object of the present invention to provide improved image bearing composite optical materials having structural and functional features that will overcome the disadvantages of the prior art methods and devices.

A further object of the present invention is to provide a composite optical material in laminated form that incorporates a photographic quality film or transparency as the image-carrying source.

A still further object of the present invention is to provide a composite optical material in laminated form of indefinite size that may readily be cut into shapes and forms suitable for a wide range of end uses, including lamp shades having coordinated image themes and lamp structural elements.

A yet further object of the present invention is to provide an improved composite optical material in flexible laminated form that incorporates bonding of an inner layer of a three-layered composite material at widely separated small areas to provide an air gap between the adjoining layers.

In a preferred embodiment, an image bearing composite optical material of indeterminate size is formed as a three-layered sandwich having inner and outer translucent members sandwiching a middle layer of image bearing photographic film. When backlighted, the full image clarity, including multiple shades of gray and color, becomes instantly visible when viewed from the side opposite the one being backlit. Other improved embodiments provide a three-layered laminate wherein an innermost layer is bonded to the middle image bearing layer at widely separated points to create a thin air gap between the two layers. The several embodiments produce a multi-purpose composite optical material ideally suited for providing abrupt changes in overall appearance responsive to being backlighted.

BRIEF DESCRIPTION OF THE DRAWINGS

Additional objects and advantages of the invention will become apparent to those skilled in the art as the description proceeds with reference to the accompanying drawings wherein.

BEST MODE FOR CARRYING OUT THE INVENTION

Figures 1, 2:
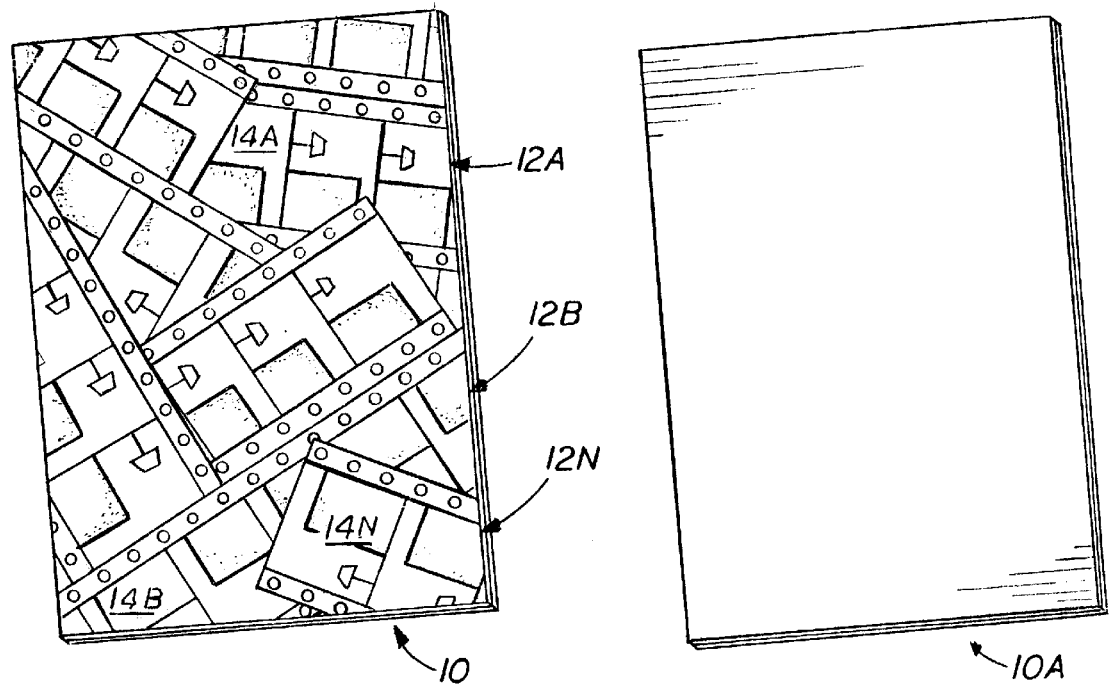
FIG. 1 is a perspective view of a swatch of image bearing composite optical material according to the present invention.
FIG. 2 is a perspective view of the same swatch of composite optical material of FIG. 1 as viewed in the absence of backlighting.

Referring now to FIG. 1, there is shown a perspective view of a sample of the thin sheet image bearing composite optical material according to the present invention. A sample 10 is part of a larger sheet of indefinite size, and the images visible on its surface are the result of optical structures and processes to be described. A plurality of photographic film images 12A, 12B . . . 12N may be combined to form an overall visual pattern of separate film strips artfully arranged, which strips in turn display a collection of individual images 14A, 14B . . . 14N on each of their frames. These resulting images derive from one or more film transparencies embedded within the layered structure of the composite optical material 10, under certain viewing conditions.

Figure 3:
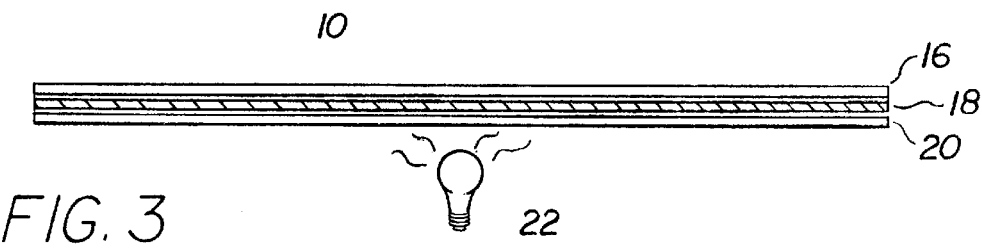
FIG. 3 is a fragmentary cross section of the composite optical material showing its constituent layers.

FIG. 3 is a cross-sectional view of a preferred embodiment of the composite optical material showing the primary layers used in its construction. The composite material 10 consists of an outer translucent layer 16 of paper or fabric, which is bonded to a middle layer 18 of photographic film. This bonding is accomplished along substantially all of the entire flat surface areas of the two layers that are adjacent to or contiguous with each other. An inner diffusing layer 20, such as white paper or vellum, is similarly bonded to the layer 18. Ideally, white antique parchment may be used for the outer and inner layers 16 and 20, and clear adhesives may be employed to achieve a suitable bond of high uniformity between both the inner and outer layers and the film layer sandwiched between them. Lightly tinted or grainy-structured materials (but also translucent) may also be employed for the outer layer in order to impart a pleasingly textured appearance. A lamp 22 positioned adjacent the inner layer 20 provides the means by which the images contained in the film layer 18 become highly visible when viewed from the outer layer side of the composite material 10.

In the absence of illumination via the lamp 22, or other intense source of light directed from the inner layer side of the composite material (such as direct sunlight), the three-layered laminated structure operates to produce a sharply distinct and plain appearance. Momentary reference to the perspective view of FIG. 2 shows no indication of the images 12 and 14 in the non-backlighted, or quiescent, condition shown as 10A. These two distinct appearances for the same material—10 of FIG. 1 when backlighted, and 10A of FIG. 2 when not backlighted—provide an excellent means for introducing dramatic changes in appearance of the composite material, and the presentation of distinct and detailed images in response to abrupt lighting changes.

Ideally, the film layer 18 is a photographic quality transparency containing the usual full range of opaqueness and colors as are encountered in commercial film. The layer 18 may contain a number of separate film strips placed side by side or overlapped in a montage, or the layer 18 may comprise a single sheet transparency photographically or digitally processed. In either case, it is desirable that the inner and/or outer layers be uniformly bonded to it using an adhering technique that does not introduce any significant optical defects into the composite material 10. In baseline preferred embodiments, conventional time-cured, optically clear adhesives lightly applied or sprayed on the various layers have produced acceptable results. For ease of fabrication, other adhesive types—such as heat or light-cured types—may also be employed.

Figure 4:
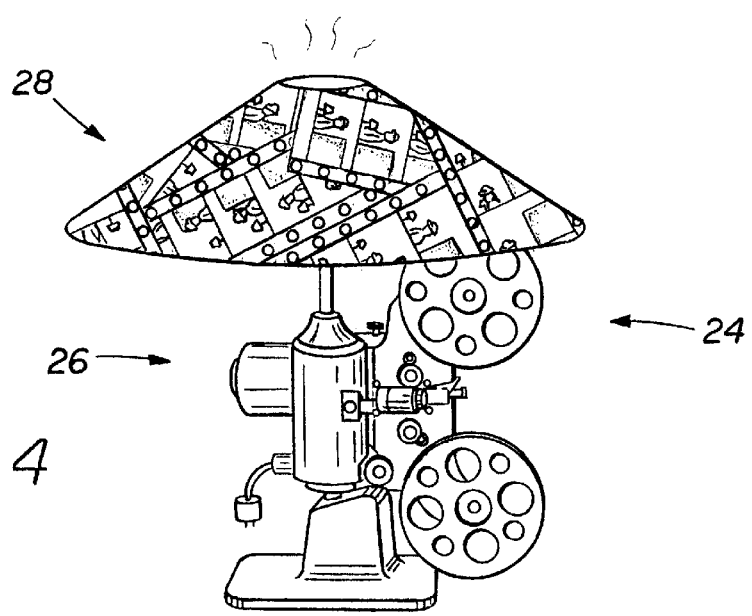
FIG. 4 shows a Cinémage™ MovieLamp lamp having an image bearing shade that expands on the film transparency image theme as suggested in FIG. 1.

Enumerable applications for the composite material 10 exists. The composite material is at its best when used in environments where significant or abrupt light changes naturally occur. These may include window coverings, room dividers, lamp shades, and the like. FIG. 4 depicts a distinctive electric table lamp 24, which may have its lamp shade fabricated from a sheet of the composite material taught in the present invention. A lamp base 26 consists of an authentic piece of movie projection hardware reclaimed from the early days of the motion picture arts. These types of artifacts are wonderful examples of American design and workmanship that may be transferred into exciting and treasured lamps for the table or desk. The effect of these converted lamps is greatly heightened by incorporating a lamp shade 28, which picks up the cinematographic motif in the form of an image bearing layer containing actual or replicas of photographic film. In a Cinémage™ MovieLamp lamp produced by the MacLamps Inc. firm of Laurel, Md., a highly thematic lamp ideally suited for exploiting the properties of the composite material 10 is available. With the lamp 24 turned off, the lamp shade 26 presents a neutral or image-free appearance. When the lamp 24 is turned on, the images contained in the film layer 18 abruptly take over and their full detail and clarity as well as color are clearly visible. Because the layer 18 contains high resolution images on translucent film, the full detail contained in the layer are presented at high illumination levels, as compared to the early attempts to achieve these effects where silhouette image layers were used. The "no shades of gray" silhouettes not only reduce image detail, they also adversely affect useful lamp output.

Beyond the cinematic theme of the illustrative Cinémage™ MovieLamp lamp of FIG. 4, the possibilities are virtually endless. The substitution of various types of subject matter for the images carried by the middle layer 18 in the composite material 10 provide an unlimited capability to coordinate visual themes in lampshades, as well as in other very different end usage items. Typical alternate usages, as described in the aforementioned U.S. patents are: Window shades in U.S. Pat. No. 467,567 to Michel; shower panel in U.S. Pat. No. 5,545,446 to Looi et al.; and a food product wrapper in U.S. Pat. No. 2,240,072 to Hodgdon et al.

Figure 5:
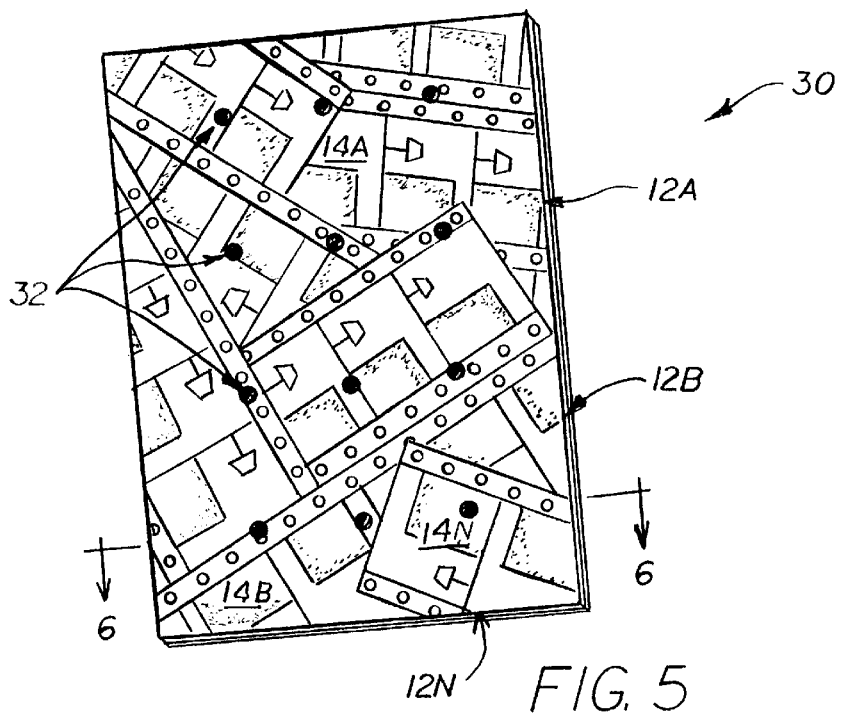
FIG. 5 is a perspective view of an alternate embodiment of image bearing composite optical material according to the present invention.

Improved embodiments of composite optical materials are described in connection with FIGS. 5, 6, and 7. Referring to FIG. 5, there is shown a perspective view of a first improved embodiment of an image bearing composite optical material incorporating a modified bonding technique. A sample 30 is also part of a larger sheet of indefinite size and, as with that depicted in FIG. 1, shows images visible on its viewing surface when backlighted. Also visible, but to a lesser extent, is an array of small dot-like areas 32. The dots 32 are shown, illustratively, as being equidistantly disposed in a rectangular pattern, and each dot 32 is shown exaggerated in size for emphasis.

Figure 6:
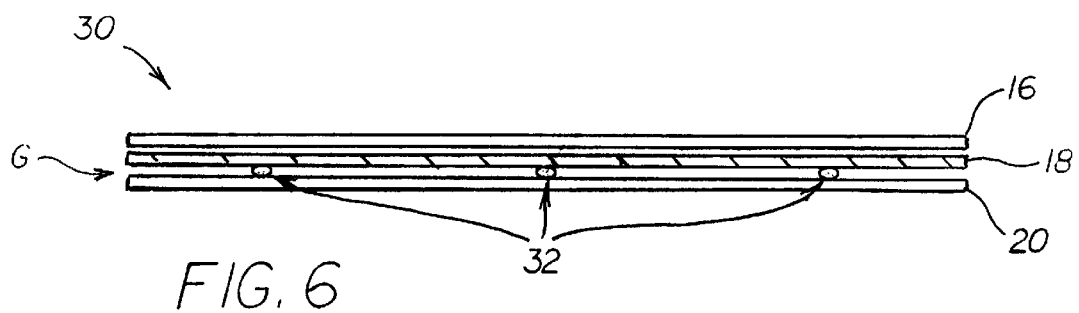
FIG. 6 is a fragmentary cross section of the alternate embodiment of the composite optical material showing its adhesive/spacing feature.

FIG. 6 is a cross-sectional view (not to scale) of the improved composite material 30 taken along the lines 6—6 of FIG. 5, wherein the layers 16, 18, and 20 may be identical in structure to the like numbered elements described with respect to FIG. 1. However, the array of dots 32 between the middle layer 18 and the inner layer 20 represents tiny clumps or regions of adhesive used to bond the adjacent or contiguous layers together while providing a small air gap G between the two. Ideally, the adhesive employed should be optically clear, but due to the very small size of dots 32, a slightly opaque adhesive could be used without materially disrupting the film images definition. Depending on the stiffness of the layers involved, the dots 32 may be spaced a few inches apart while still supporting an airspace separation between layers 18 and 20 of less than 1 millimeter. The purpose of this air gap is to negate image transmission so that the images on the middle photographic film layer 18 are not visible when looking down or up into a lamp, or when looking from the normally backlighted diffusing layer side of an alternate type of article. Regardless of whether the backlighting lamp is on or off, all that is visible is the plain white inner diffusing layer 20. This does not produce any appreciable reduction of light transmission through the composite material 30. The outer layer 16 must, as before, be fully bonded to the film layer 18 in order to achieve the desired level of image transmission that makes the outer layer surface seem to disappear when the lamp is turned on.

Figure 7:
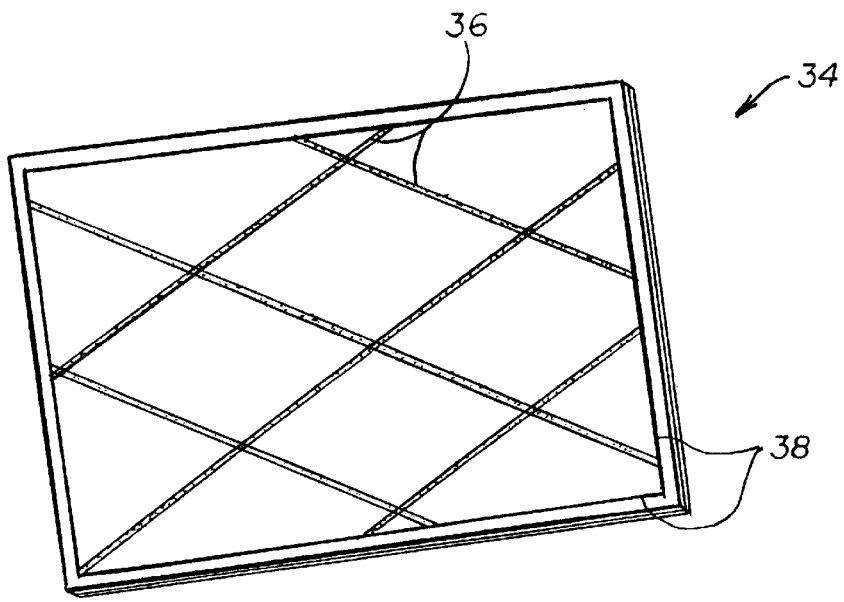
FIG. 7 is a perspective view of a further alternate embodiment showing an improved method of bonding certain layers of the composite optical material of FIG. 5.

A second version of the improved image bearing composite optical material is shown in FIG. 7. Whereas the first improved version of composite material 30 of FIG. 5 used an array of adhesive dots 32 to provide the air gap between the layers 18 and 20, the second improved version 34 uses a diamond-shaped pattern of intersecting lines of adhesive 36. Thus, the pattern of thin adhesive lines 36 bonds the adjacent or contiguous layers 18 and 20 together as before, and also leaves the desired air gap between them. Additionally, as before, the tiny dimensions of the line 36 and the more or less optically clear properties of the adhesives they represent prevent any significant decrease in the clarity of images produced by the layer 18 when viewed under backlighted conditions. Alternatively, the layers 18 and 20 may be bonded together by use of thin lines of edge adhesive 38 positioned near the edges of the sample 34 when it is of finite size.

For each of the three improved embodiments of FIGS. 5–7, and related versions, the interrupted adhesive patterns provide the same benefit. That is the ability to fabricate the image bearing composite optical material in sheets of indefinite size, while retaining the convenience of handling laminated sheets of unitary construction. So, large sheets may be cut to smaller sizes and shapes as needed while preserving the air gap benefit and avoiding difficult separate layer handling steps.

Although the invention has been described in terms of selected preferred embodiments, the invention should not be deemed limited thereto, since other embodiments and modifications will readily occur to one skilled in the art. For example, synthetic materials such as plastics and resins having suitable optical properties may be used for the inner and outer layers; the impact of digital technology on the image gathering, processing, and choice of the physical medium itself that makes up the image bearing middle layer; and well-known bonding means other than the conventional use of air or time-cured adhesives—such as IR, RF, and laser heating—are also contemplated. It is therefore to be understood that the appended claims are intended to cover all such modifications as fall within the true spirit and scope of the invention.

What is claimed is:

1. An image bearing composite optical material structured as a laminated sheet, comprising:

(a) an outer layer of translucent material and an inner layer of translucent material;

(b) a middle image bearing layer consisting of one or more photographic film transparencies, positioned between said outer and inner layers, said middle layer bonded to said outer layer along substantially all of their adjacent surface areas and said middle layer bonded to said inter layer only at their respective perimeters;

(c) whereby, said image bearing film produces a clearly visible image when viewed from a first side of said sheet while being illuminated from a second side.

2. The laminated composite optical material of claim 1 wherein said outer and inner layers are selected from the group consisting of paper, fabric, and synthetic materials.

3. The laminated composite optical material of claim 2 wherein said bonding is accomplished by the application of an optically transparent adhesive between said adjacent surfaces and along said perimeters.

4. The laminated composite optical material of claim 3 wherein said adhesive is cured by a process selected from the group comprising time cured, heat cured, and light cured.

5. The laminated composite optical material of claim 3 wherein said image bearing layer is a single sheet of film or transparency material photographically processed to include a montage of individual film strips.

6. An image bearing composite optical material formed as a laminated sheet, comprising:

(a) an outer layer of translucent material;

(b) a middle image bearing layer comprising one or more photographic quality film transparencies having a first side positioned flatly against a flat side of said outer layer and bonded to said outer layer along substantially all of their adjacent surface areas;

(c) an inner layer of transparent material positioned flatly against a second side of said middle layer and bonded to it by a plurality of widely separated small regions of adhesive to produce an air gap between a high proportion of their adjacent surface areas;

(d) whereby said image bearing layer produces a clearly visible image when viewed from said outer layer side and backlighted from said inner layer side, and a significantly less distinct image when not backlighted.

7. The laminated composite optical material of claim 6 wherein said outer and inner layers are selected from the group consisting of paper, fabric, and synthetic materials.

8. The laminated composite optical material of claim 6 wherein said bonding is accomplished by the application of an optically transparent adhesive.

9. The laminated composite optical material of claim 6 wherein said adhesive is cured by a process selected from the group comprising air cured, time cured, heat cured, and light cured.

10. The laminated composite optical material of claim 6 wherein said image bearing layer is a single sheet of film or transparency material photographically processed.

11. An image bearing composite optical material made as a laminated sheet of indefinite size, comprising:

(a) an outer layer of translucent material;

(b) a middle image bearing layer comprising one or more photographic quality film transparencies having a first side positioned flatly against a flat side of said outer layer and bonded to said outer layer along substantially all of their adjacent surface layers;

(c) an inner layer of transparent material positioned flatly against a second side of said middle layer and bonded to it by a plurality of widely separated small regions of adhesive to produce an air gap between a high proportion of their adjacent surface areas;

(d) said outer and inner layers selected from the group consisting of paper, fabric, and synthetic materials;

(e) said plurality of widely separated regions being adhesive areas spaced at least one inch apart and said air gap separates said adjacent middle and inner layers by less than 2 millimeters;

(f) whereby said image bearing film produces a clearly visible image when viewed from said outer layer side and backlighted from said inner layer side, and a less distinct image when not backlighted.

12. The laminated composite optical material of claim 11 wherein said widely separated regions are dots of adhesive less than 2 millimeters in size and are spaced at least one inch apart.

13. The laminated composite optical material of claim 11 wherein said widely separated regions are a plurality of parallel lines of adhesive less than 2 millimeters in width and spaced at least one inch apart.

14. The laminated composite optical material of claim 13 wherein said plurality of lines include a first group of parallel lines with a first orientation and a second group of intersecting parallel lines with a second orientation.

15. The laminated composite optical material of claim 11 wherein said widely separated regions are lines of adhesive less than 2 millimeters in width and positioned along the peripheral edges of said sheet.

* * * * *